July 11, 1944.    J. V. HORR    2,353,238
EDUCATIONAL DEVICE
Filed Nov. 30, 1943    2 Sheets-Sheet 1
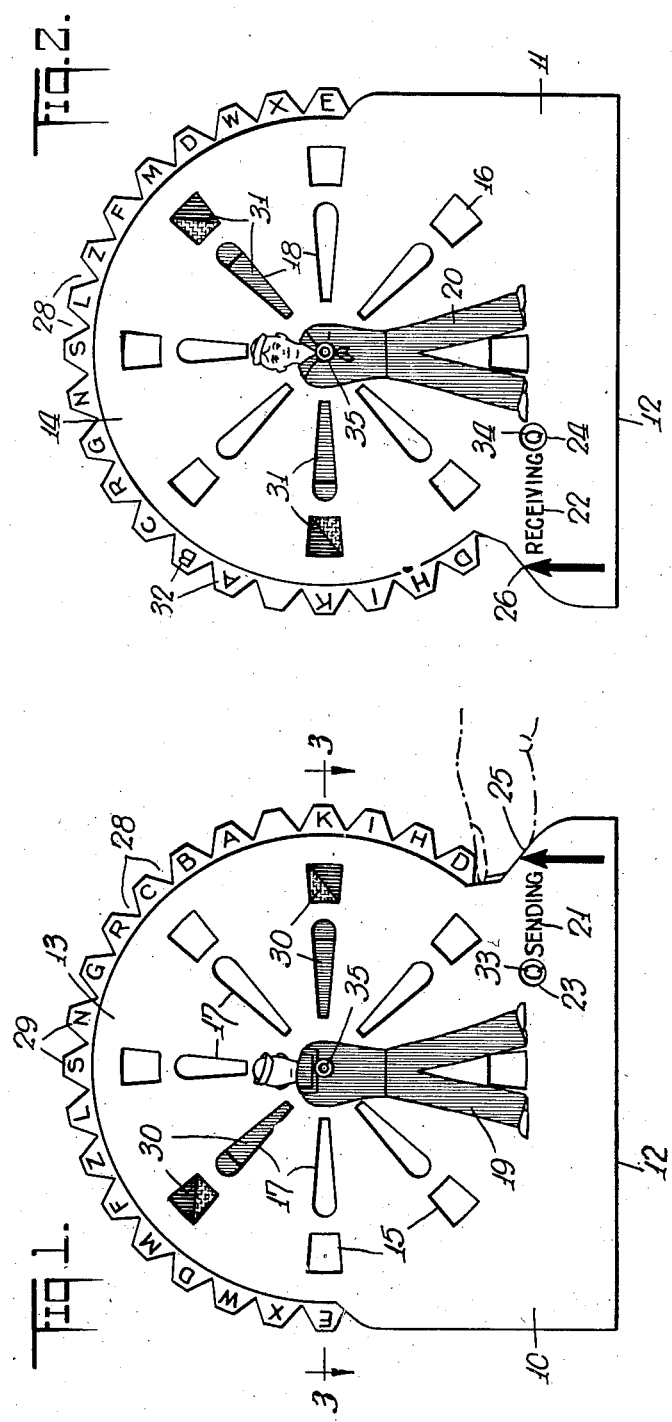
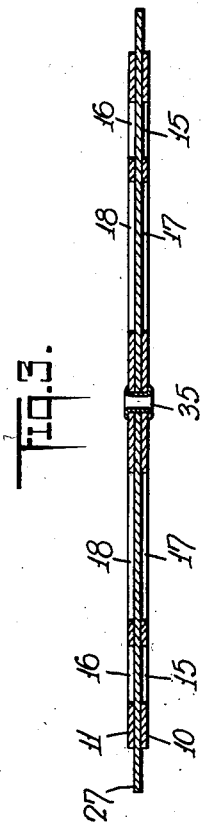
INVENTOR
*John V. Horr.*
BY
*Guck + Speitenfeld*
ATTORNEYS July 11, 1944.   J. V. HORR   2,353,238
EDUCATIONAL DEVICE
Filed Nov. 30, 1943   2 Sheets-Sheet 2

INVENTOR
John V. Horr
BY
*Huck & Breitenfeld*
ATTORNEYS

Patented July 11, 1944

2,353,238

UNITED STATES PATENT OFFICE 2,353,238

EDUCATIONAL DEVICE

John V. Horr, North Tarrytown, N. Y., assignor to Einson-Freeman Co., Inc., Long Island City, N. Y., a corporation of Delaware Application November 30, 1943, Serial No. 512,293

6 Claims. (Cl. 35—14)

My present invention relates generally to educational devices, and has particular reference to a device for use in the teaching of code signaling.

While certain phases of my invention are not necessarily restricted to any particular code or mode of signaling, the device is primarily intended and is particularly useful for teaching the so-called and well-known semaphore code. In this type of signaling, a pair of flags are wielded by the signaler, one in each hand, the flags being successively brought into and momentarily maintained in various positions along a circular arc. These positions are customarily eight in number.

A primary object of the invention is to provide a device which may be manufactured at low cost and of inexpensive material such as cardboard, the device being light in weight, compact in nature, of rugged construction, and easy to understand and manipulate.

The type of device to which my invention relates consists essentially of a panel having apertures therein, and a relatively movable disk mounted behind the panel and provided with indicia which register with the apertures in predetermined fashion as the disk is rotated to depict in succession the various combinations of the code whose teaching the signaling device is intended to aid. In the teaching of the semaphore code, the apertures are eight in number and are arranged in a circular arc, and the indicia on the disk comprise representations of semaphore flags.

It is among the objects of the present invention to provide certain improvements in devices of this general character, whereby the manipulation of the device is simplified, its instructional character improved, and its usefulness enhanced.

One of the features of the present invention lies in providing the panel with a circular edge portion, and in mounting the disk concentrically with respect to this edge portion, the disk being provided with a projecting border in which notches are formed, each notch affording a finger grip by means of which the disk may be rotated, and the border portion of the disk bearing certain informational markings which facilitate the rapid rotation of the disk into various different positions.

A further feature of the invention lies in providing a rear panel in which there are apertures which register with those in the first-named panel, the disk bearing on its reverse face certain indicia which correspond and register with the indicia on the obverse face thereof, whereby the various depictions of different signals may be caused to appear on both sides of the device simultaneously but from opposite view points.

I achieve the foregoing general objects, and such other objects and advantages as may hereinafter appear, in the manner illustratively exemplified in the accompanying drawings in which:

Figure 1 is a view of the device viewed from one side thereof;

Figure 2 is a similar view of the device from the opposite side thereof;

Figure 3 is an enlarged cross-sectional view taken substantially along the line 3—3 of Figure 1;

Figure 4:
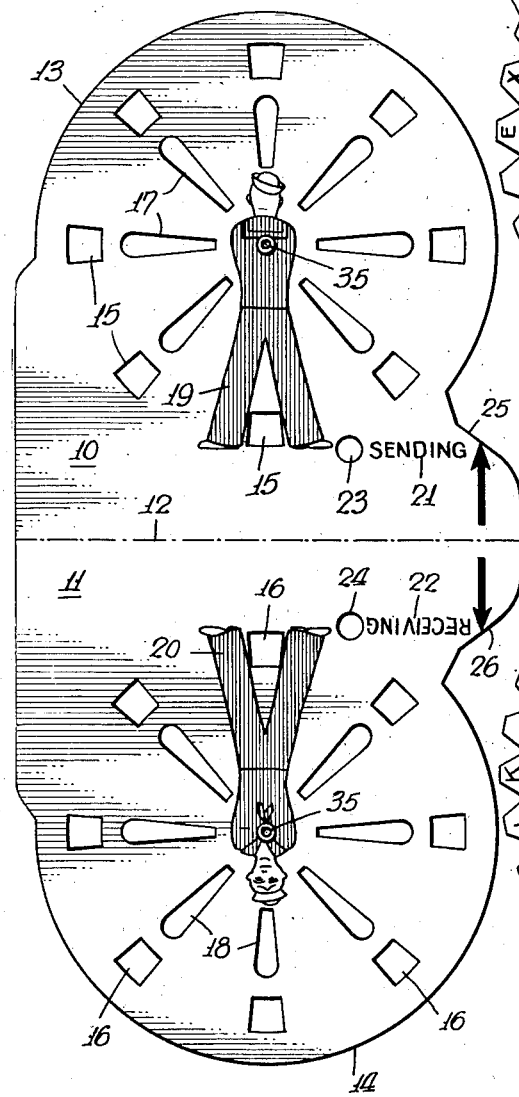
Figure 4 is a plan view of the blank from which the two panels are constructed.

In constructing the present device, a blank is first cut and shaped as shown substantially in Figure 4, whereby two similar but opposite panels 10 and 11 are provided, these panels being secured together along the line of junction 12. The panel 10 is provided with the circular edge portion 13, and the panel 11 is provided with the similar and corresponding circular edge portion 14. Concentrically arranged with respect to the edge portion 13 are the apertures 15, and in the particular device herein illustrated, these apertures are eight in number and are arranged in a circular series corresponding to the eight positions of the semaphore code. The panel 11 is provided with a similar series of apertures 16.

Preferably, but not necessarily, the panel 10 is also provided with an auxiliary set of apertures 17 which are arranged in somewhat radiating fashion for a purpose presently to be described. The panel 11 may be provided with a corresponding set of auxiliary apertures 18.

At its midportion, the panel 10 is provided with a representation 19 of a signaler, and in the illustrated embodiment I have shown, by way of example, how this representation may conform to the general contours and appearance of a man in Navy uniform. The panel 11 is provided with a similar representation 20, but the depictions 19 and 20 differ in the fact that one of them presents the appearance of the signaler from the rear while the other presents the appearance of the same signaler from a signal-receiving position. Thus, I have illustratively shown the representation 19 as a signaler viewed from the rear and with this representation there may be a printed designation "sending" as indicated at 21, while the representation 20 simulates the appearance of the same signaler as viewed from the front, and with this representation there may be a printed designation "receiving" as indicated at 22.

Adjacent to the marking 21 the panel 10 may be provided with the additional aperture 23, and the panel 11 may be provided with the corresponding additional aperture 24.

When the device is assembled, the panels 10 and 11 are brought into superposed relationship, as indicated in Figures 1 and 2, and all of the apertures of one panel are in accurate registry with the corresponding apertures of the other panel.

For a purpose presently to be described, at least one of the panels is provided with an abutment which I have shown in the form of an oblique shoulder 25 on the panel 10, and a corresponding shoulder 26 on the panel 11, these shoulders forming together a single shoulder or abutment when the device is assembled.

Figure 5:
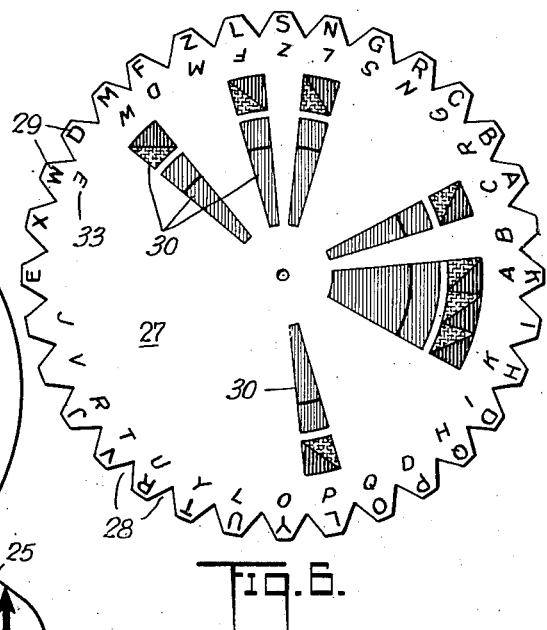
Figure 5 is a plan view of one face of the disk.
Figure 6:
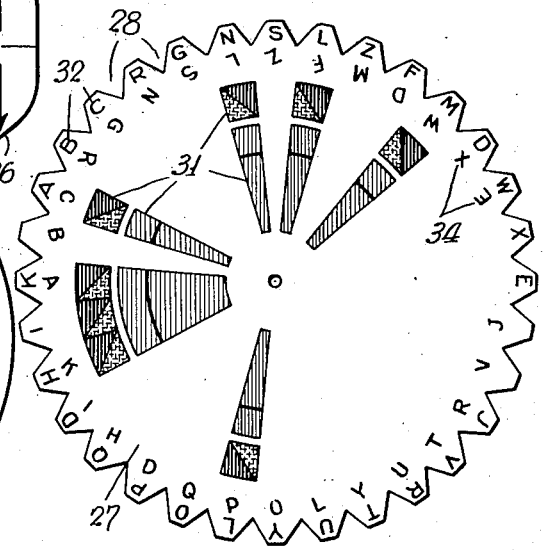
Figure 6 is a similar view of the reverse face.

The disk 27 that is used with the panels is shown most clearly in Figures 5 and 6. It will be observed that the disk is substantially circular in shape and that it has a border portion provided with a series of notches 28. In the wedge-shaped projections between the notches 28 there are a series of markings 29 which I have shown in the form of letters of the alphabet. These letters are not arranged alphabetically, however, but bear a definite relationship to certain indicia 30 arranged in substantially radial dispositions upon the face of the disk 27. Each of these indicia has an outer end portion which is preferably colored and which simulates or represents a semaphore flag, and may have an inner narrower portion which simulates the arms of a signaler.

The particular arrangement of the indicia 30 forms no part of my present invention, since it is well-known per se, but I believe that the duplication of these indicia on the reverse face of the disk, as indicated in Figure 6, is a new departure in this art.

Assuming that the face of the disk 27 which is visible in Figure 5 is the "obverse" face, it will be observed that the "reverse" face shown in Figure 6 is in every respect the same as that of Figure 5 except that the various markings and indicia are in reverse. That is to say, each of the indicia 31 shown in Figure 6 is in exact registry with the corresponding indicia 30 of Figure 5. Accordingly, if the disk 27 were made of transparent material, a single set of indicia would suffice. It is preferable, however, that the disk 27 be made of opaque material such as cardboard, with its obverse and reverse faces printed and embellished as indicated in Figures 5 and 6.

Along the marginal portion of the disk 27, on its reverse face (Figure 6), there are a series of markings 32 which correspond with the markings 29 on the obverse face.

Additionally, both faces of the disk have a second set of markings which are ultimately intended to show through the apertures 23 and 24 respectively, this additional set of markings being designated by the reference numeral 33 in Figure 5, and by the reference numeral 34 in Figure 6.

In assembling the device, the disk 27 is interposed between the panels 10 and 11, and is pivotally or rotatably secured in position by means of an eyelet or the like, as shown at 35 in Figures 1 and 2, this axis of rotation being concentric with respect to the disk 27 and with respect to the circular edge portions 13 and 14. This eyelet serves also to hold the two panels 10 and 11 in superposed relationship and is thus the only operation necessary to be performed in assembling the device. During this assembly, the disk is arranged in such a way that the obverse face shown in Figure 5 will lie directly beneath the panel 10, so that the indicia 30 will ultimately show through the apertures 15 and 17; and this will necessarily result in having the indicia 31 ultimately show through the apertures 16 and 18 of the panel 11.

The use of the device is indicated most clearly in Figures 1 and 2. It will be observed that the notched border portion of the disk 27 projects beyond the circular edges 13 and 14, so that most of the markings 29 and 32 are always visible. Each notch affords a finger grip whereby the disk may be rotated. In using the device, the finger is inserted into a selected notch and the disk is then rotated either in a clockwise direction if held as in Figure 1, or in a counterclockwise direction if held as in Figure 2. When the finger encounters the shoulders 25—26, the act of rotation is necessarily halted. At the instant when this encounter takes place, the indicia which register with and show through the apertures of the panels will correspond (in terms of the semaphore code) with the letter or marking immediately beneath the actuating finger. Stated otherwise, the informational markings on the border portion of the disk correspond, respectively, with the indicia registered with the apertures of the panels at the instant of encounter between the actuating finger and the abutment 25—26. At the same time, the corresponding letter on the set of markings 33 registers with the aperture 23, and the same letter on the set of markings 34 registers with the aperture 24.

Accordingly, the device may be used to great advantage in teaching the prospective signaler not only how his arms should be positioned when "sending" any particular letter or series of letters, but also how his arms will look to someone at a signal-receiving station. In this way, the user of the device may drill himself, not only in "sending," but also in "receiving." In the first case, he would use the device as indicated in Figure 1, and in the second case, he would use the device as indicated in Figure 2. Not only do the designations "sending" and "receiving" (as shown at 21 and 22 respectively) aid him in this regard, but the different representations 19 and 20 serve graphically to impress upon his mind the differences between the relative arm positions during the acts of sending or receiving signals.

In general, it will be understood that the details herein described and illustrated may be modified by those skilled in the art without departing from the spirit and scope of the invention as expressed in the appended claims.

Having thus described my invention and illustrated its use, what I claim as new and desire to secure by Letters Patent is:

1. An educational device for teaching code signaling comprising a panel having apertures and a circular edge portion, a circular disk mounted for rotation beneath said panel and concentric with said edge portion, indicia on said disk arranged to register successively with said apertures as said disk is rotated, said disk having a border projecting beyond the periphery of the panel throughout at least half of the circumference of the disk and provided with a series of notches each of which affords a finger grip by means of which said disk may be rotated, an abutment on the panel positioned to be encountered by the finger to limit each act of rotation, and alphabet markings on said border arranged to correspond, respectively, with the indicia registering with said apertures at the instant of said encounter, said disk having the major portion of the alphabet exposed on the projecting border thereof.

2. An educational device as set forth in claim 1, said apertures comprising a circular set of eight corresponding to the eight positions of the semaphore code, said indicia comprising representations of semaphore flags and being circularly arranged and equally spaced whereby the various combinations of the semaphore code may be successively depicted by rotational movements of said disk.

3. An educational device for teaching code signaling comprising a panel having apertures and a circular edge portion, a circular disk mounted for rotation beneath said panel, indicia on said disk arranged to register successively with said apertures as said disk is rotated, said apertures comprising a circular set corresponding to the positions of the semaphore code, said indicia comprising representations of semaphore flags and being circularly arranged and equally spaced whereby the various combinations of the semaphore code may be successively depicted by rotational movements of said disk, a rear panel secured to the first-named panel and arranged behind said disk and provided with apertures which register with those in the first-named panel, indicia on the reverse face of said disk registering with those on its obverse face, whereby said depictions appear on both sides of the device simultaneously but from opposite viewpoints, and indicia on each panel to indicate the obverse or reverse facing of the semaphore flags exposed at said panel.

4. An educational device as set forth in claim 3, said disk having a projecting border concentric with the circular edge portion of the panel and provided with a series of notches each of which affords a finger grip by means of which said disk may be rotated, an abutment on at least one of said panels positioned to be encountered by the finger to limit each act of rotation, and informational markings on said border arranged to correspond, respectively, with the indicia registering with said apertures at the instant of said encounter.

5. An educational device as set forth in claim 3, said first-named panel bearing a representation of a signaler as viewed from the rear, the other panel bearing a corresponding representation of the same signaler as viewed from a signal-receiving position.

6. An educational device for teaching code signaling comprising front and rear panels secured together along one edge thereof and having circular edge portions spaced apart, a circular disk rotatably mounted between the panels concentric with said circular edge portion, each panel having apertures therein opposite the apertures in the other panel, indicia on each opposite side of said disk arranged to register successively with the apertures as said disk is rotated, the apertures in each panel comprising a circular set of eight corresponding with the eight positions of the semaphore code, said indicia comprising representations of semaphore flags and being circularly arranged and equally spaced whereby the various combinations of the semaphore code may be successively depicted by rotation of the disk and with the same combination of semaphore flags exposed simultaneously at both opposite sides of the device, one of said panels bearing a representation of a signaler as viewed from the rear and the other panel bearing a corresponding representation of the same signaler as viewed from signal-receiving position, each representation of the signaler depicting the legs thereof spaced apart with one of said apertures therebetween.

JOHN V. HORR.